United States Patent
Kesling et al.

(10) Patent No.: US 9,054,908 B2
(45) Date of Patent: Jun. 9, 2015

(54) RFI MITIGATION USING BURST TIMING

(71) Applicant: Intel Corporation, Santa Clara, CA (US)

(72) Inventors: Dawson W. Kesling, Davis, CA (US); Maynard C. Falconer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/722,749

(22) Filed: Dec. 20, 2012

(65) Prior Publication Data

US 2014/0177752 A1 Jun. 26, 2014

(51) Int. Cl.
H04K 1/02 (2006.01)
H04L 25/03 (2006.01)

(52) U.S. Cl.
CPC ................. *H04L 25/03828* (2013.01)

(58) Field of Classification Search
None
See application file for complete search history.

(56) References Cited

U.S. PATENT DOCUMENTS

2002/0064245 A1 * 5/2002 McCorkle ..................... 375/346

* cited by examiner

*Primary Examiner* — Adolf DSouza
(74) *Attorney, Agent, or Firm* — Patent Capital Group

(57) ABSTRACT

A chip is provided to include a circuit to transmit one or more data bursts, where the circuit includes burst timing logic to insert gaps of a determined length between adjacent data bursts to reduce noise at a desired frequency, where the length of each gap is to be determined based on energy of a preceding burst and a current burst.

19 Claims, 3 Drawing Sheets

RFI MITIGATION USING BURST TIMING

TECHNICAL FIELD

The present invention relates generally to bit stream communications and in particular, to transmission with RFI mitigation.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Unintentional emissions from local data buses can be a main source of broadband interference with wireless radio reception in mobile computing platforms such as tablets, smartphones, and portable personal computers. For example, a portable computing platform may have at least three radio antennas, with one or more in its base. In addition, such platforms typically support five or more radio bands, e.g., Wi-Fi (802.11a/b/g/n), Bluetooth technology, and various different cellular standards (LTE, WiMax), to mention just a few. The addition of even more wireless functionality, along with ongoing radio integration and reduction in system dimensions, suggest that on-board radio noise interference will continue to be problematic if not addressed.

Conventional noise mitigation approaches, which use to rely on passive shielding and strategic antenna placements, now employ more complicated, active data coding techniques for mitigating generated bus noise at desired frequency bands. Two general approaches are known and used for data spectral manipulation. The first is pulse shaping or filtering. Unfortunately, this approach may not be well suited for digital IC processes and is normally incompatible with chip-to-chip signaling technologies. The second approach uses line coding where binary signals are modified before transmission on the bus. This approach may provide strong reduction of radiated energy in predefined spectral regions, with manageable implementation complexity. Coding bits can be distributed among code words (such as is commonly done by standard 8B10B line coding for self-clocking), or "stuffed" between periods of active data transmission (such as the gaps between DDR data bursts). Unfortunately, however, such coding approaches use increased bus data payloads and therefore carry inherent platform power impacts. For example, bus driver and termination power may be increased by 10~30%. Though this may represent a small portion of overall system power, it can have a noticeable effect on battery life, for example, in smartphone, tablet and notebook platforms. Accordingly, new solutions may be desired.

Figure 1:
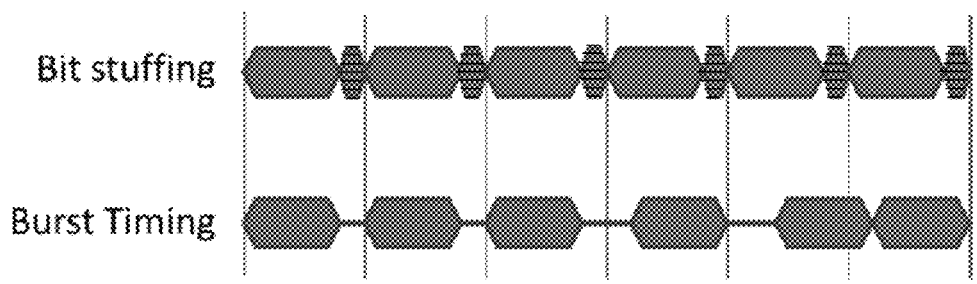
FIG. 1 is a timing diagram showing burst streams for a conventional bit stuffing example compared with a bit timing example in accordance with some embodiments.

With reference to FIG. 1, in some embodiments, active noise mitigating burst timing techniques are provided herein. Burst timing, as disclosed herein, may be akin to bit stuffing, but rather than having to add new bits to the bus data stream, the time between bursts of active data is controlled to obtain desired spectral effects. The concept is illustrated in FIG. 1. In the bit-stuffing portion, shaded but not hatched areas represent bursts of eight data bits, while the shaded, horizontally hatched areas represent sets of two coding bits. In the burst timing modulation example, data bursts are shifted to or away from a clock edge within a specified range (+/−2 bits) of a nominal burst period boundary. In this example, data bursts are 8 bits in length, and the allowed gap (inter-burst gap) is from 0 to 4 "zero" bits, with a periodic burst, it results in burst start options of a burst starting anywhere from between 2 bits prior to a burst period boundary and 2 bits after the boundary. (Of course depending on design considerations, any suitable combination of acceptable inter-burst gap size and/or distance from burst period boundary parameters may be used. With a periodic burst stream, they may define the same thing, but with non-periodic or otherwise asynchronous bursts, an allowable gap size range may be the only meaningful, or otherwise necessary, gap parameter constraint.)

Figure 2:
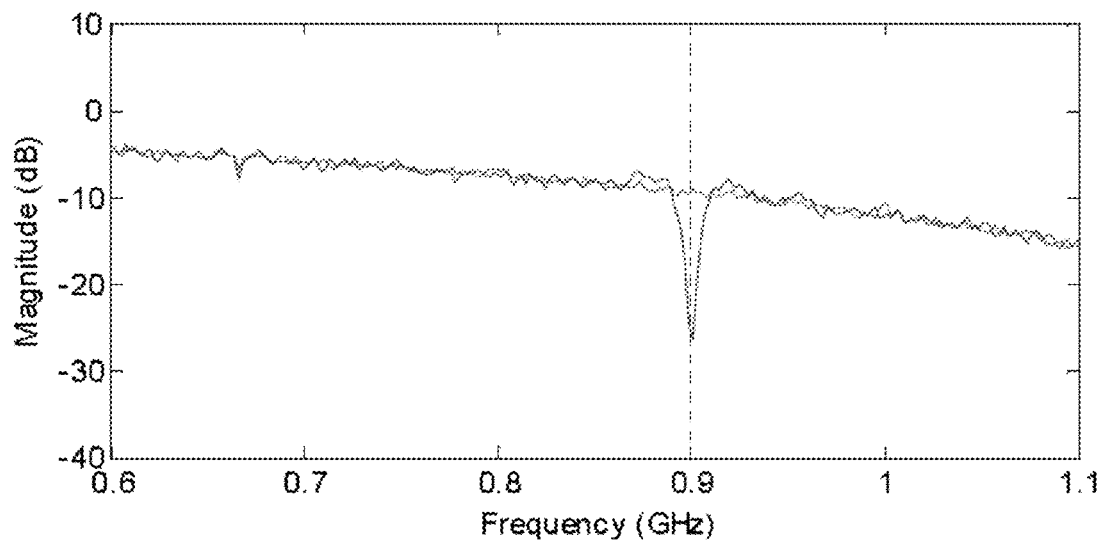
FIG. 2 is a graph showing (in the darker line) a spectrum with RFI mitigation at a desired frequency in a burst-timing example in accordance with some embodiments in accordance with some embodiments.

FIG. 2 is a graph showing (in the darker line) a spectrum with RFI mitigation at a desired frequency in a burst-timing example in accordance with some embodiments. The lighter line shows a normal random-data spectrum for comparison. In this example, the bus rate was 1333 MT/s and bursts were sent on clock edges within one cycle of a nominal burst-to-burst timing of five. In this example, RFI mitigation was for a WCDMA channel so that a 19 dB power notch, centered about 0.9 GHz., was created. (Note that depending on utilized methods, multiple notches may be created. Moreover, it is expected that a platform will control the burst timing logic to create or remove attenuated notches at different frequency bands, during platform operation, depending on the particular radios being used.

Figure 3:
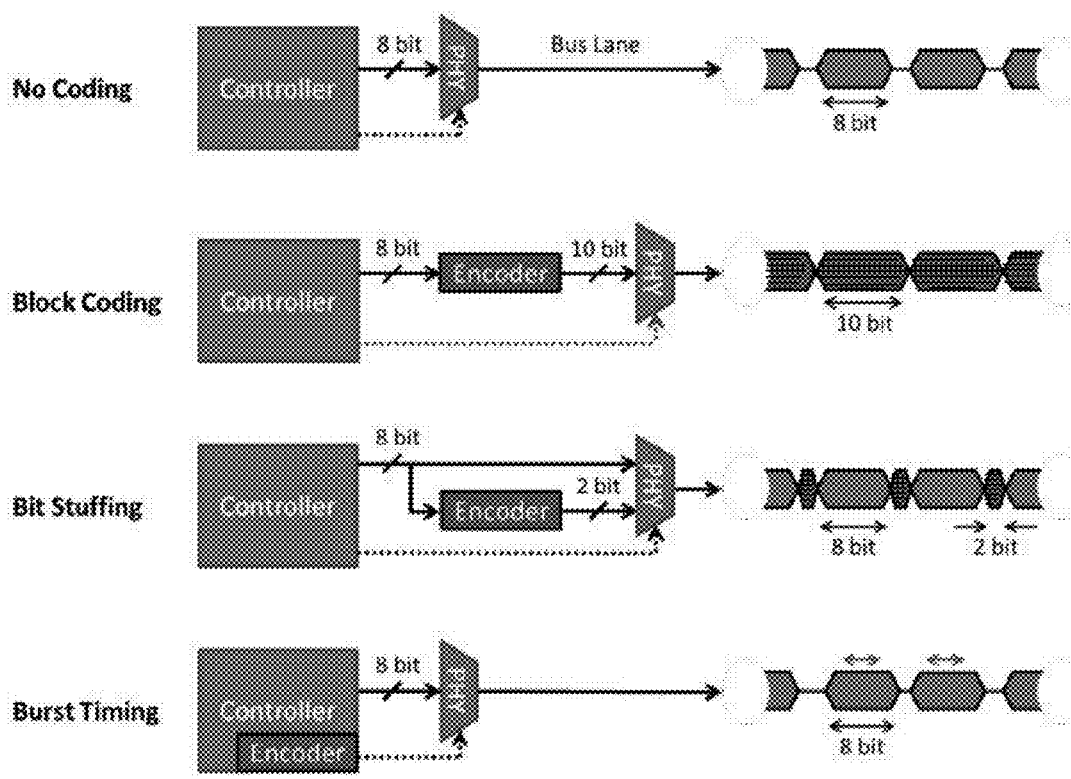
FIG. 3 is a conceptual diagram showing prior art burst transmission schemes contrasted against an exemplary burst timing system in accordance with some embodiments.

Burst timing modulation may be simpler to implement than previous coding approaches since there may not be a need to add physical layer circuitry to drive and terminate additional bits on the bus. The conceptual block diagram below (FIG. 3) illustrates this concept, in contrast with other approaches. For example, the power and implementation advantages of this new approach may be particularly significant in DDR applications. Write data modulation can be done by a burst scheduler within memory controllers. A small FIFO could be used to buffer read data arriving within a specified range around the expected CAS-to-CAS delay. In another example, logic could be used to control burst transmit timing in DRAM, where the reduction in complexity over bit stuffing may be particularly important. Minimal changes (if any) would be needed for DRAM receiver circuits since the source-synchronous bus strobes are controlled by the memory controller along with the data.

In addition to data noise, burst modulation may also be applicable to bus strobe noise. DDR strobe noise has been found to be a significant source of RF noise in new TV white space bands. Strobe timing in source synchronous buses like DDR may necessarily be coincident with data timing, so by using a 1010 . . . data stream (mimicking a clock or strobe pattern) as the "data" into the burst gap logic, the same design that mitigates data noise can be used to mitigate strobe noise as well.

Figure 4:
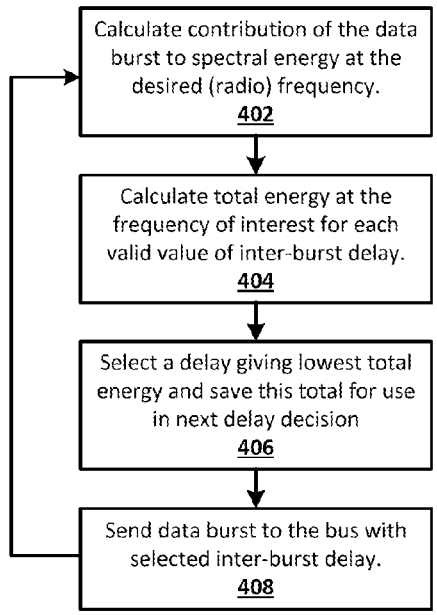
FIG. 4 shows a flow for implementing burst gap RFI mitigation in accordance with some embodiments.

FIG. 4 shows a flow for implementing burst gap RFI mitigation in accordance with some embodiments. At 402, the routine calculates the contribution of a data burst of spectral energy at a desired frequency or frequency band. For example, it could perform a discrete Fourier transform to make the calculation. The particular techniques of Patent Application No. PCT/US2011/054498, filed on Oct. 1, 2011 may be referenced, and are incorporated by reference herein.

Next, at 404, it calculates the total energy at the frequency of interest for each possible inter-burst delay option. (A range of inter-burst bit gaps may be imposed. For example, in some embodiments, a gap range of 0 to 4 gap bits could be used. In addition, another constraint could attach the data burst to a defined gap distance from a utilized burst period. For example, using a maximum gap range of 4 zero bits, 4-bit gap, a constraint that the data burst must begin from −2 to +2 zero bits away from the burst period boundary. The Burst Timing example of FIG. 1 uses data bursts that are 8 bits wide, a burst period that is 10 bits wide, a maximum 4 bit gap, and a requirement that the data burst begin between +/−2 zero bits from a burst period boundary.) The total energy at the frequency of interest for this step is the sum of the total energy after previous burst and the contribution from the present burst. Valid values of this delay may be set by the bus protocol or by data throughput considerations, for example.

At 406, the routine selects a delay (gap size) that results in the lowest energy and saves this result for use in the next delay decision. (The total energy resulting from the particular delay selection for this burst in this step will be needed for the next data burst at step 404).

At 408, the routine sends the data burst to the bus driver with the selected inter-burst delay and then loops back to 402 for the next data burst. (Note that this process can be done for an individual bus lane or for some number of bus lanes. Radio interference physics and implementation practicalities set practical limits on the number of lanes included in a common delay decision.)

Figure 5:
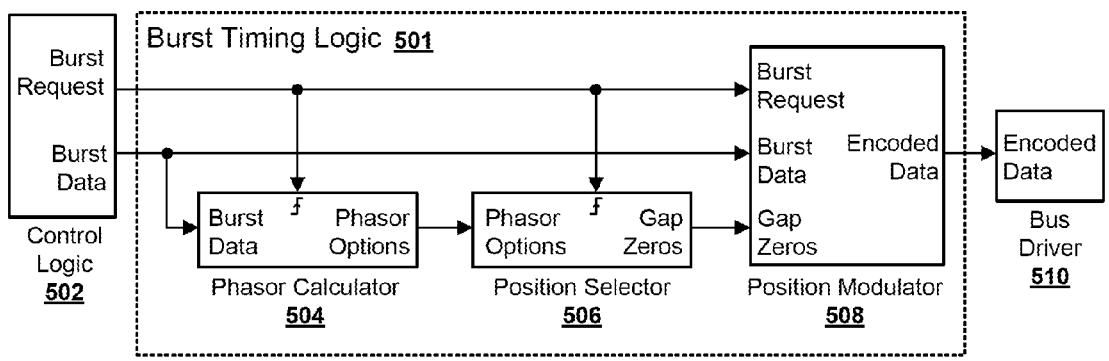
FIG. 5 is a diagram showing a portion of a bit stream transmitter with burst gap RFI reduction in accordance with some embodiments.

FIG. 5 is a diagram showing a portion of a bit stream transmitter with burst gap RFI reduction in accordance with some embodiments. it generally includes conventional control logic and bus driver blocks (502, 510), along with burst timing logic 501 comprising a phasor calculator 504, position selector 506, and position modulator 508, all coupled as indicated. When a data burst is to be transmitted, the control logic block 502 requests that a burst of specific data be sent over the bus. The phasor calculator block calculates the spectral energy contribution of the burst at each valid gap option (inter-burst delay). These are labeled "Phasor Options". In some methods, the phase angle of the noise contribution from the burst depends on the delay of the burst. For this reason, the energy may be comprehended by a "phasor" quantity representing the amplitude and phase angle of the noise at a radio frequency. The Position Selector 506 adds the phasor options to the total energy from the previous burst to get the possible total energies with the current burst included. It selects the best possibility (lowest total energy) and sends the corresponding number of gap zero bits to the position modulator block 508. The position modulator 508 forms the encoded data stream by inserting the gap zeros before the burst data to get the desired inter-burst delay. The bus driver block 510 sends the burst with prescribed delay over the bus. (Note that the gap bits do not necessarily need to be zeros but could be ones, a tri-state level or some other signal having negligible impact on the bus energy at a desired radio frequency.)

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A chip, comprising:
a circuit to transmit one or more data bursts, the circuit comprising burst timing logic to insert gaps of a determined length between adjacent data bursts to reduce noise at a desired frequency, wherein the length of each gap is to be determined based on energy of a preceding burst and a current burst.

2. The chip of claim 1, in which the gap size is limited to being up to a specified value.

3. The chip of claim 1, in which the gap is to be displaced from a burst period boundary by an amount within an allowable range.

4. The chip of claim 3, in which the allowable range covers negative to positive displacement values including zero displacement.

5. The chip of claim 1, in which the circuit determines a gap size based on a minimal energy resulting from the preceding burst and the current burst with different allowable gap size possibilities.

6. The chip of claim 1, in which the circuit is part of a communications interface on a CPU chip.

7. The chip of claim 6, in which the circuit is part of a memory controller.

8. The chip of claim 1, in which the circuit is part of a memory chip.

9. An apparatus, comprising
a computing platform having an I/O interface with a transmitter circuit that includes burst timing logic having burst timing logic to insert gaps of respective determined length between adjacent data bursts from the transmitter to mitigate RFI at a target frequency, wherein the length of each gap is to be determined based on energy of a preceding burst and a current burst.

10. The apparatus of claim 9, in which the burst timing logic comprises a phasor calculator to calculate a spectral energy contribution of a burst to be transmitted for each of a set of valid gap size option.

11. The apparatus of claim 10, in which the burst timing logic comprises a position selector to add the phasor options to the energy from the preceding burst to obtain possible total energies with the current burst included.

12. The apparatus of claim 11, in which the position selector selects a lowest total energy option and sends the corresponding number of zero bits to the position modulator.

13. The apparatus of claim 12, comprising a position modulator to form an encoded data stream by inserting the zero bits before a present data burst to get a desired inter-burst delay.

14. An apparatus, comprising:
burst timing logic to determine a gap to insert ahead of a present data burst based on spectral radiated energy that would be created from a sum of energy from a preceding data burst and energy from the present data burst.

15. The apparatus of claim 14, in which the gap is to be a number of zero bits, the number to be within a pre-specified range.

16. The apparatus of claim 15, in which the logic determines gaps for a plurality of lanes that are part of a chip-to-chip interface transmitter.

17. The apparatus of claim 16, in which the interface is a DDR interface.

18. The apparatus of claim 17, in which the logic is part of a memory controller.

19. The apparatus of claim 17, in which the logic is part of a memory chip.

* * * * *